Patented Sept. 26, 1939

2,173,992

UNITED STATES PATENT OFFICE 2,173,992

METHOD OF CURING MEATS

Hugh E. Allen, Evanston, Ill., assignor of one-half to Albert G. McCaleb, Evanston, Ill.

No Drawing. Application May 23, 1936, Serial No. 81,506

5 Claims. (Cl. 99—159)

The present invention relates to a method whereby meats are cured with a compound or composition, containing curing salts, which is activated (i. e. endowed with abnormal curing properties) by being subjected to actinic rays, including the ultra-violet, emitted by a quartz mercury vapor lamp.

The invention is predicated upon my discovery that curing compounds and compositions, which include sodium chloride and the more potent curing salts (such as sodium nitrite, sodium nitrate, potassium nitrate, and mono-sodium glutamate), when properly subjected to the actinic rays aforesaid, are endowed with desirable functional characteristics and capabilities which normally they do not possess. For example, it is well known that hams and bacon cannot be cured at temperatures substantially higher than 45° F., by any heretofore known method utilizing any known curing compound or composition, without putrefying in part while curing in part, and thereby becoming unfit for food. Yet the method of the present invention, which utilizes the aforesaid artificially produced actinic rays, successfully may be practiced at temperatures as high and higher than 75° F., in making hams, bacon, corn beef, etc., which are of excellent appearance and flavor, completely cured and entirely devoid of any evidence of putrefaction in any of the parts thereof.

The circumstance last mentioned renders the present invention admirably suited to the needs of farmers, small butchers and others who, for lack of refrigeration facilities, have been precluded from utilizing the old style curing methods except in those relatively short seasons when a temperature of 45° F., or lower, reasonably may be expected to prevail throughout the periods required for the complete curing of the meats.

In practicing the present invention I prefer to utilize (but am not limited to) a curing compound in the nature of a pickle solution produced by dissolving in each gallon of water two pounds of a curing material consisting of thoroughly mixed ingredients in percentages (by weight) substantially as follows:

Formula A

| | Percent |
|---|---|
| Sodium nitrite | ½ of 1 |
| Sodium nitrate | 2 |
| Raw (unrefined) sucrose | 10 |
| Refined sucrose | 8 |
| The meat tinting and curing composition (comprising the reaction product of haemoglobin and monosodium glutamate, plus potent curing salts) of United States Letters Patent No. 2,021,621, dated November 19, 1935 | 1 |
| Mono-sodium glutamate | 5 |
| Sodium chloride | the remainder |

This pickle solution is placed in an open topped container, preferably to a depth not to exceed twelve inches, and is there subjected for a period of from 15 to 30 minutes, to the activating or super-energizing effect or effects of a quartz mercury vapor lamp which is rich in ultra-violet and other actinic rays. The container which I have usually employed has been an earthenware vessel having a diameter of approximately twenty inches.

In employing a Burdick lamp type RX20, equipped with a QH100 quartz mercury vapor tube (being a tube manufactured by General Electric Vapor Lamp Co., having an arc length of approximately two and one-half inches and requiring for the maintenance of its operation an electrical input of approximately 210 watts) the said tube, provided with a suitable reflector, is placed centrally above and about eighteen inches from the surface of the pickle solution against and into which the actinic rays are discharged. The pickle solution is preferably, but not necessarily, agitated, either continuously or occasionally, during its subjection to ray activation. In some instances I have satisfactorily activated the pickle solution when it has had a depth of two feet, but in such cases, using the lamp above mentioned, it has seemed necessary to apply the rays to the pickle solution for a period in excess of 30 minutes, but not in excess of one hour,—more or less continuously agitating the pickle solution during the activation thereof.

The next step, preferably, is conventionally to "pump" the meat to be cured with a portion of the activated pickle solution. This pumping may be effected through the blood vessels of the meat chunk or, alternatively, the activated pickle solution may be freely distributed throughout the meat chunk with a hollow needle (through which the pumping tool discharges) which is repeatedly inserted at random into the meat chunk without any particular regard to blood vessel location.

The meat chunk is then immersed in the activated pickle solution and is there left for the usual curing period,—i. e., from 3 to 10 days, depending upon the size, kind and weight of the meat chunk under treatment. It is desirably overhauled, i. e., is given a reversed position in the pickle solution, at about the middle of the curing period, in accordance with conventional practice.

All of the foregoing may be performed and accomplished in a room wherein a temperature as high or higher than 75° F. prevails at all times. Nevertheless, the meat chunk, at the completion of its treatment, is found to be admirably cured, of good appearance, of appealing taste and odor, and without the slightest evidence of putrefaction. That this phenomenon is attributable to peculiar properties in the pickle solution which the actinic rays engender, has been repeatedly demonstrated as follows: A given piece of meat has been severed into two chunks which are substantially identical as to size and weight. The two meat chunks have been identically pumped, immersed in portions of the same initial batch of pickle solution, left in the pickle solution for identical curing periods, overhauled at the same times,—all of this being accomplished in a room where a temperature of 75° F. or higher prevails at all times. The only difference in the method, as practiced upon the two meat chunks, has been that one of them has been pumped with and immersed in a portion of the pickle solution which has been activated with the actinic rays; whereas the other of the meat chunks has been pumped with and immersed in a portion of the pickle solution which has not been so activated. In all such cases, at the end of the curing period, the meat chunk treated with the activated portion of the pickle has been found to be admirably cured, without any evidence of putrefaction, whereas the other chunk invariably has been found to have undergone such loathsome spoilage as to be quite unfit and unsafe for consumption by man or beast.

I deem it good practice to submit all portions of the outer surface of a meat chunk to the action of the actinic rays of the lamp, for 20 to 40 minutes, (a) before being pumped, (b) when overhauled, and (c) when finally removed from the pickle solution.

While, as before stated, I prefer that the pickle to be activated shall be made from a curing material prepared in accordance with hereinbefore given Formula A, I have found that the beneficial results of the present invention may be realized when the pickle solution is prepared by dissolving in each gallon of water approximately two pounds of any one of the curing materials (some of which are very old and well known) prepared in accordance with formulae (in which the stated percentages are by weight) as follows:

Formula B

| | Per cent |
|---|---|
| Sodium chloride | 98 |
| Potassium nitrate | 2 |

Formula C

| | |
|---|---|
| Sodium chloride | 88 |
| Potassium nitrate | 2 |
| Sucrose (raw or refined) | 10 |

Formula D

| | |
|---|---|
| Sodium chloride | 97½ |
| Sodium nitrite | ½ of 1 |
| Sodium nitrate | 2 |

Formula E

| | |
|---|---|
| Sodium chloride | 87½ |
| Sodium nitrate | 2½ |
| Sucrose (raw or refined) | 10 |

Formula F

| | |
|---|---|
| Sodium chloride | 89¼ |
| Sodium nitrite | ¾ of 1 |
| Sucrose (raw or refined) | 10 |

Formula G

| | |
|---|---|
| Sodium chloride | 97¼ |
| Potassium nitrate | 2 |
| Sodium nitrite | ¾ of 1 |

Formula H

| | |
|---|---|
| Sodium chloride | 99¼ |
| Sodium nitrite | ¾ of 1 |

Formula I

| | |
|---|---|
| Sodium chloride | 97½ |
| Sodium nitrate | 2½ |

Formula J

| | |
|---|---|
| Sodium chloride | 94½ |
| Mono-sodium glutamate | 3 |
| Sodium nitrite | ½ of 1 |
| Sodium nitrate | 2 |

It will thus be understood that I may realize the advantages of the present invention by applying actinic rays, of the kind or kinds emitted by a quartz mercury vapor lamp, to practically any curing salt solution suitable for the curing of hams, bacon, corn beef, and other meat chunks. The invention, however, is not necessarily confined to the activation of curing salts in solution.

Curing compositions which are employed in effecting so-called "dry" cures of hams, bacon, corn beef, etc., may have their curing properties so decidedly modified, by the aforesaid actinic rays, that they, too, are rendered capable of effecting satisfactory cures at high temperatures whereat they have been unable satisfactorily to function in the past. One such curing composition, which has enjoyed great commercial success although limited heretofore to use at low temperatures, is the one described in British patent to Allen and McCaleb No. 411,006, dated September 18, 1933. The preferred formula (percentages by weight) of that composition is as follows:

Formula K

| | Per cent |
|---|---|
| Granulated sodium chloride | 86.00 |
| Pulverized potassium nitrate | 2.00 |
| Granulated sugar | 8.00 |
| Burned sugar coloring material | 2.00 |
| Wood-smoke tars | .75 |
| Chemically pure glycerin | .50 |
| Dry essence of natural spices | .75 |

Such compositions usually have their ingredients thoroughly commingled in a power driven mixer. I prefer to activate such compositions in a mixer which is open at the top and which so operates as continuously to bring different portions of the treated materials to the top of the batch. Using such a mixer I activate the composition, through the open top of the mixer, while the mixing operation progresses. When employing a conventional power mixer of 600 lb. capacity, loaded to its capacity with the ingredients of the last mentioned or any other suitable composition, comprising curing salts for effecting any of the now well known "dry" cures, I cause the hereinbefore mentioned quartz mercury vapor lamp to discharge its actinic rays into the open top of the mixer, and onto the moving materials therein, from a position approximately eighteen inches above the treated materials, for a period of from 1 to 1½ hours.

The present invention and discovery also contemplates and affords great advantage in the curing of finely divided meats such as are employed in the manufacture of sausages, bologna, meat loaves and the like. Such meats usually are operated upon in a power chopper which may, and for my purpose should, consist of a bowl, having an open top, in which chopping knives operate.

I add the requisite amount of any suitable curing composition to the "block" of meat chunks to be operated upon by the chopper knives and then cause the aforesaid quartz mercury vapor lamp to discharge its rays upon the chopper contents while the knives perform their normal function. In chopping a block consisting of 100 lbs. of meat I find that a period of from 20 to 40 minutes is a satisfactory one in which to accomplish both adequate activation of the curing composition and the requisite chopping of the meat. I prefer that the curing composition employed and activated, in the curing of the chopped meats, shall be the hereinbefore mentioned tinting and curing composition (comprising the reaction of product of haemoglobin, and mono-sodium glutamate, plus potent curing salts) of United States Letters Patent No. 2,021,621, dated November 19, 1935. However, any other suitable composition, containing curing salts, may be employed. Curing compositions prepared in accordance with any of the hereinbefore given formulae are satisfactory. Usually about 3 to 4 lbs. of the selected curing composition are required for each 100 lbs. of meat to be chopped.

When using a quartz mercury vapor lamp of greater or less capacity than the one herein specifically described, the periods of activation, of the curing compounds or compositions, usually will be correspondingly shortened or lengthened. However, when any given lamp is set to the task of activating any particular curing compound or composition, the exact time period for which such compound or composition should be activated by the said lamp may be and preferably is determined by practical tests.

What I regard as new and desire to secure by Letters Patent of the United States is:

1. The method of curing meat which consists in subjecting curing salts to the modifying action of actinic rays, such as are emitted by a quartz mercury vapor lamp, and then treating the meat with the modified salts.

2. The method of curing a meat chunk which consists in subjecting a curing salt solution to the modifying action of actinic rays of the kind emitted by a quartz mercury vapor lamp, pumping the meat chunk with a portion of such modified solution and immersing the chunk in another portion of such a solution so modified.

3. The steps in the method of curing a meat chunk which consists in subjecting a curing salt solution to the modifying action of actinic rays emitted by a quartz mercury vapor lamp, and then pumping the meat chunk with the modified solution.

4. The method of curing a meat chunk which consists in subjecting a curing salt solution to the modifying action of actinic rays emitted by a quartz mercury vapor lamp, and immersing the meat chunk in the modified solution.

5. In a process of treating meats with curing salts, the improvement which consists in subjecting the meat and salts to the action of actinic rays of the kind emitted by a quartz mercury vapor lamp during a portion of the treating process.

HUGH E. ALLEN.